United States Patent [19]

Lista et al.

[11] 4,103,584
[45] Aug. 1, 1978

[54] STAPLE ORIENTING METHOD AND APPARATUS

[75] Inventors: Edwin L. Lista, Roseville; Kenneth S. Williams, Sacramento, both of Calif.

[73] Assignee: Aerojet-General Corporation, El Monte, Calif.

[21] Appl. No.: 521,757

[22] Filed: Jan. 18, 1966

[51] Int. Cl.² .................. F42B 33/10; C06B 21/00
[52] U.S. Cl. .................................. 86/1 R; 264/3 R
[58] Field of Search .................. 86/1; 60/256, 253; 221/156, 163, 167; 102/102; 264/3, 3 B

[56] References Cited

U.S. PATENT DOCUMENTS

| 2,944,287 | 7/1960 | Moran | 264/3 B |
|---|---|---|---|
| 3,109,375 | 11/1963 | Rumbel et al. | 102/102 |
| 3,311,678 | 3/1967 | Brock et al. | 264/3 |
| 3,359,350 | 12/1967 | Godfrey | 86/1 R X |

Primary Examiner—Harold Tudor
Attorney, Agent, or Firm—Edward O. Ansell

[57] ABSTRACT

A method of orienting metal staples randomly dispersed in a solid propellant by filling a bayonet having a screen at the bottom thereof with the uncured solid propellant mixture and forcing the mixture through the bayonet screen.

2 Claims, 3 Drawing Figures

STAPLE ORIENTING METHOD AND APPARATUS

This invention relates to a novel method of an apparatus for increasing the performance of solid rocket propellants which includes the orientation of metallic staples dispersed throughout the propellant.

It is well known that the addition of metal staples, such as wires, filaments, strips, and the like, will increase the burning rate of solid propellant rocket motors. These staples, which have a substantially higher thermal diffusivity or conductivity than the solid propellant material serve as miniature heat conductors. The increased burning rate results from the fact that the metal staples effect rapid heat transfer from the high temperature combustion gases in the flame zone to the unburned propellant in the grain. In this manner the flame propagates rapidly along the metal staple. As a result, the burning surface travels along the metal staple (heat conductor) at a much faster rate than the normal propellant burning rate. In addition, the burning surface recesses to form a cone with the metal staple at its apex and thereby becoming much larger than normal. This greatly increases the effective burning rate of the propellant grain along with the rate of gas evolution.

In a solid rocket motor, the maximum increase in burning rate obtained from the metal staples can only be achieved if the staples are oriented perpendicular (normal) to the burning surface of the propellant. Methods of dispersing metal staples within the solid propellant matrix however inevitably resulted in a random orientation of the staples. While the random orientation achieved measurable increases in burning rates, it did not produce optimum results and often times results in uneven burning. This is true for both end burning and internal burning grains.

It is therefore an object of this invention to provide an improved method for increasing the performance of solid propellant rocket motors.

Another object of this invention is to provide an improved method of orienting metallic staples dispersed within a solid propellant rocket motor.

Yet another object of this invention is to provide an improved bayonet for casting solid propellant having metal staples dispersed therein.

These and other objects of this invention will be apparent from the detailed description which follows when taken together with the appended drawings wherein.

The metallic staples which are employed as burning rate additives in solid propellants are comprised of any metal or metal alloy of high heat conductivity and high melting point such as copper, aluminum, iron, stainless steel, hafnium, brass, zirconium, silver, and many others. These staples, which may be of any cross-section such as circular, rectangular, square or many sided, can vary in length up to and, in some cases, exceeding 500 mils. In the usual case, however, all of the staples in a given matrix will be of the same length and have a maximum side to side dimension of 20 mils.

The solid rocket propellant composition is mixed in the normal manner and the staples added at some point in the process prior to the casting of the propellant. The dispersion of the staples in the propellant during the mixture thereof will result in a random or uneven orientation of the staples in the mixture. An example of a staple-containing propellant is taught in copending application Ser. No. 338,527 by Ralph W. Lawrence, filed Jan. 17, 1964, and assigned to the same assignee as the present invention.

Figure 1:
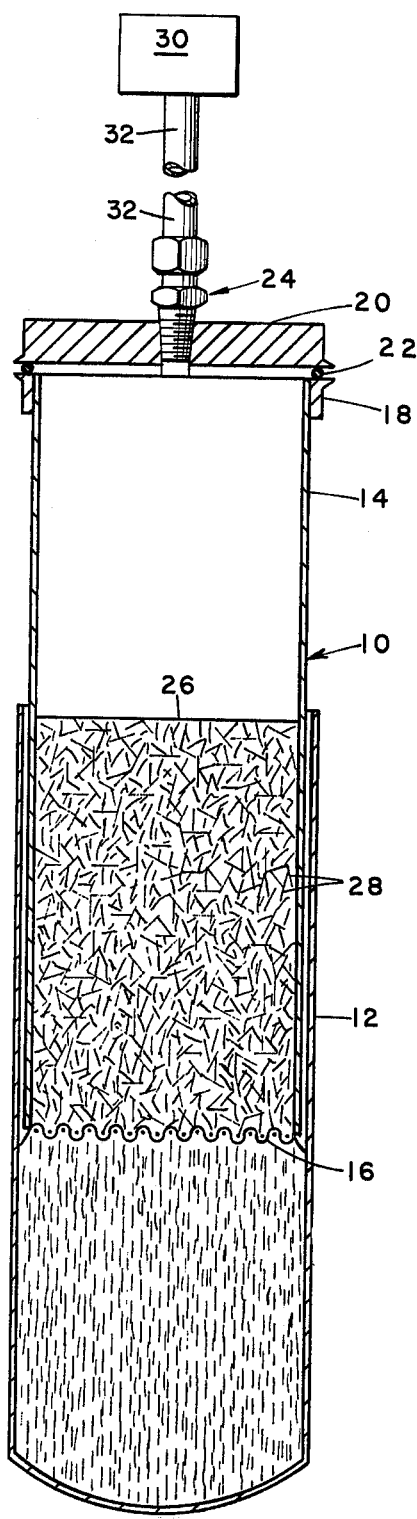
FIG. 1 is a cross-sectional view of an end burning solid propellant rocket motor casing and bayonet of the present invention during the casting process.

Referring now to FIG. 1, there is shown a propellant casting tube or bayonet 10 inserted within an end burning rocket motor casing 12. The bayonet 10 comprises a long cylindrical tube 14 having a wire cloth or screen 16 at the bottom thereof. The top of the tube 14 is fitted with a flange 18. A cover plate 20 over the top of the tube 14 effects a pressure seal with the tube flange 18 when used with an O-ring 22. A tri-clover fitting can also be used to effect this pressure seal. A fitting 24 (such as a Hansen fitting) threaded into the cover plate 20 provides access for a pressurized fluid to the top of the tube 14. A connection line 32 joins the fitting 24 with a source 30 of gas such as nitrogen under pressure.

The tube 14 of a structural material such as stainless steel is filled under vacuum with a solid propellant 26 having dispersed within it randomly orientated metal staples 28. The screen 16 retains the propellant within the tube when there is no external pressure applied to the propellant 26. The size of the openings in the screen 16 will depend primarily upon the dimensions of the staples and would normally be between 2½ and 4 mesh. Additionally, more than one screen may be utilized at the bottom of the tube 14, e.g., a 2½ mesh screen over a 4 mesh screen.

The bayonet 10, once it has been filled with propellant, is inserted, screen end down, into the motor casing 12 so that the screen 16 of the bayonet is only a short distance from the bottom of the casing 12. The outside diameter of the bayonet tube 14 should be only slightly smaller than the inside diameter of the casing 12. By applying pressure to the top of the propellant 26 by such means as a compressed or pressurized gas admitted through the fitting 24, the propellant is forced through the screen 16 at the bottom of the tube 14 and into the rocket motor casing 12. Alternately a mechanical or hydraulic displacement technique can be used to force the propellant through the screen 16.

The screen 16 through which the propellant containing the randomly oriented metal staples 28 is forced, orients the metal staples in a direction perpendicular to the plane of the screen. The openings of the screen 16 are too small to permit the metal staples to proceed through in any other orientation.

As the propellant 26, with the metal staples 28 now oriented along axis of the motor casing, fills the motor casing 12, the bayonet 10 is raised to permit the propellant to substantially fill the casing 12. The screen 16 of the bayonet 10 may be kept a short distance from the propellant already deposited or cast into the motor or may be in contact with the deposited propellant such that the propellant offers a slight resistance to the flow which helps to align the staples. The propellant will in effect flow from the bayonet into the casing as a viscous fluid under pressure. In this manner the propellant cast into the motor casing retains the staple orientation resultant from passing through the screen. This cast propellant can now be cured in the conventional manner as if there were no staples dispersed therein.

With the metal staples oriented along the axis of the motor casing, the staples will be normal to the burning surface of an end-burning propellant grain. Thus there will be provided the maximum increase available in the burning rate from the use of the added metal staples.

Should for any reason it be desirable to provide the staples thus oriented in an internal burning motor, a central void could be provided in the bayonet 10 to enable the bayonet to be inserted into the casing 12 with a core in place. Such a staple orientation would normally, however, be undesirable for an internal burning motor.

Figure 2:
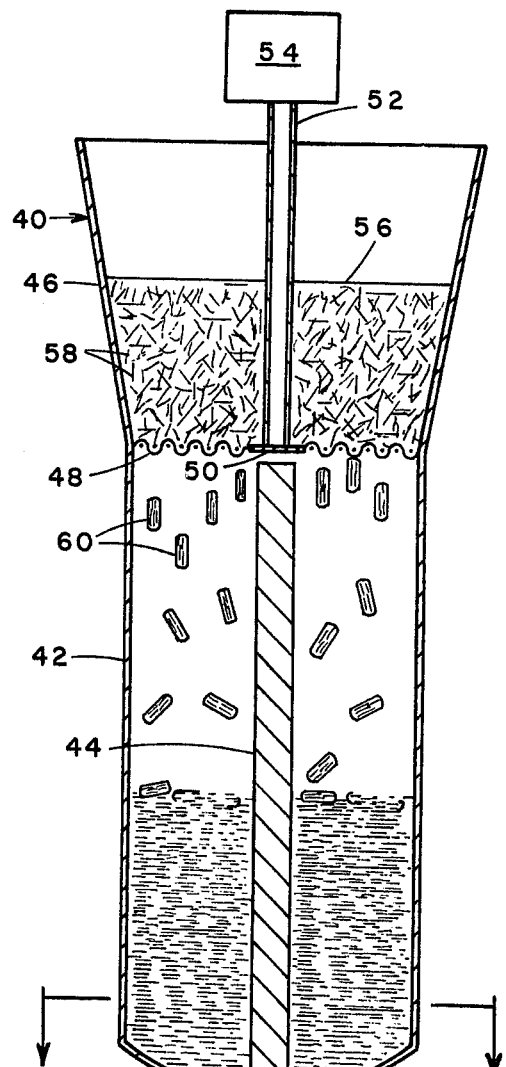
FIG. 2 is a cross-sectional view of an internal burning solid propellant rocket motor casing and bayonet of the present invention during the casting process.
Figure 3:
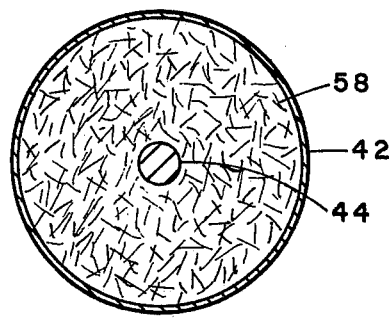
FIG. 3 is a cross-sectional view of the casing of FIG. 2 taken along line 3—3 of FIG. 2.

Referring now to FIG. 2, there is shown a bayonet 40 positioned over an internal burning solid propellant rocket motor casing 42. A core 44 is positioned in the central portion of the casing 42.

The bayonet 40 comprises a tube 46 which is shown as a truncated conical section with the base of the conical section upward. A fine mesh wire screen or cloth 48 extends across the lower end of the tube 46 which is positioned over the upper end of the casing 42. A diaphragm 50 is positioned in the screen 48 directly over the core 44 of the casing 42. The diaphragm 50 may be connected to a vibrator 54 external to the bayonet 40 by means of a hollow rod 52. The bayonet 40 would be filled with a solid propellant 56 in which metal staples 58 are randomly dispersed.

With the bayonet 40 positioned over the casing 42, the propellant 56 containing the staples 58 will either, due to gravity or as a result of an externally applied pressure, pass through the screen 48. The openings of the screen 48 are such as to produce a large number of elongated propellant droplets 60, with each droplet having the metal staples orientated along its axis of elongation. A second rotatable screen, not shown, may be suspended immediately below the screen 48 to encourage the formation of droplets rather than a string like extrusion. The droplets 60 will then fall to the bottom of the casing 42.

It has been experimentally demonstrated that although the droplets 60 tumble in random directions as they fall to the bottom of the casing 42, they will come to rest in the bottom of the casing with their axis of elongation in a plane perpendicular to the axis of the casing 42. Thus regardless of the angle at which the droplets hit the partially filled propellant in the bottom of the casing, they flop over on their side before coming to rest. In this manner the staples are oriented in a plane normal to the axis of the casing. The diaphragm 50 prevents droplets 60 from falling directly upon the core 44.

This planar randomization of the staples permits even burning of the propellants. Conventional casting of the propellant around the core 44 has been known to partially orient the staples which resulted in uneven burning characteristics for the propellant. The planar randomization will not, however, produce the maximum burning rate achievable with the metal staples which requires that the staples be oriented normal to the burning surface. In the case of an internal burning motor this requires a radial orientation of the staples.

To achieve this radial orientation, the screen 48 is vibrated up and down by means of the vibrator with the greatest amplitude at the center of the screen 48 at the point where the rod 52 is attached to the diaphragm 50 of the screen 48. The vibration will give the individual droplets of propellant falling from the screen 48 a radial momentum either toward or away from the center of the screen 48. This radial momentum will result in the droplets 60 achieving a radial orientation in the casing 42 and thereby orient the staples normal to the propellant burning surface which will produce the maximum burning rate from the staples.

While preferred forms and embodiments of the invention have been shown and described, it will be apparent to those skilled in the art that modification can be made without departing from the principles and spirit of the invention, the scope of which is defined in the appended claims.

What is claimed is:

1. A method of orienting metal staples dispersed in a solid propellant which comprises the steps of:
    (a) filling a bayonet having a screen at the bottom thereof with uncured solid propellant having metal staples randomly dispersed therein;
    (b) forcing the uncured propellant through the bayonet screen to orient the metal staples within the solid propellant; and
    (c) vibrating the screen as the propellant is forced therethrough to impart a radial moment to the propellant leaving said screen.

2. The method of claim 1 and in addition the steps of:
    (a) inserting the bayonet into the interior of a rocket motor casing before forcing the uncured propellant through the bayonet screen; and
    (b) withdrawing the bayonet from the casing during the step of forcing the uncured propellant through the screen.

* * * * *